US012687049B2

(12) United States Patent
Hunt et al.

(10) Patent No.: US 12,687,049 B2
(45) Date of Patent: Jul. 21, 2026

(54) LOCK FOR A MOTOR VEHICLE

(71) Applicant: Kiekert AG, Heiligenhaus (DE)

(72) Inventors: Robert J. Hunt, Davisburg, MI (US); Dimo Kloubert, Bonn (DE)

(73) Assignee: KIEKERT AG, Heiligenhaus (DE)

( * ) Notice: Subject to any disclaimer, the term of this patent is extended or adjusted under 35 U.S.C. 154(b) by 89 days.

(21) Appl. No.: 18/350,373

(22) Filed: Jul. 11, 2023

(65) Prior Publication Data

US 2025/0020001 A1 Jan. 16, 2025

(51) Int. Cl.
*E05B 79/08* (2014.01)
*E05B 85/02* (2014.01)

(52) U.S. Cl.
CPC .............. *E05B 79/08* (2013.01); *E05B 85/02* (2013.01)

(58) Field of Classification Search
CPC .......... E05B 79/00; E05B 79/02; E05B 79/08; E05B 85/02; E05B 77/10
See application file for complete search history.

(56) References Cited

U.S. PATENT DOCUMENTS

| | | | | |
|---|---|---|---|---|
| 8,376,419 B2 * | 2/2013 | Konomoto | E05B 85/26 | 292/216 |
| 8,967,683 B2 * | 3/2015 | Akizuki | E05B 85/26 | 292/201 |
| 9,249,607 B2 * | 2/2016 | Akizuki | E05B 85/02 | |
| 9,464,466 B2 * | 10/2016 | Nozawa | E05B 79/08 | |
| 9,976,323 B2 * | 5/2018 | Nozawa | E05B 77/10 | |
| 9,982,468 B2 * | 5/2018 | Mittelbach | E05B 85/02 | |
| 10,280,660 B2 * | 5/2019 | Nozawa | E05B 85/02 | |
| 10,458,158 B2 * | 10/2019 | Takagi | E05B 85/02 | |
| 10,472,868 B2 * | 11/2019 | Nozawa | E05B 79/08 | |
| 11,111,701 B2 * | 9/2021 | Inan | E05B 85/02 | |
| 11,466,482 B2 * | 10/2022 | Izumi | E05B 85/02 | |
| 2016/0319576 A1 * | 11/2016 | Nagaoka | E05B 85/02 | |
| 2020/0224464 A1 * | 7/2020 | Cumbo | E05B 81/16 | |
| 2021/0025204 A1 * | 1/2021 | Nam | E05B 77/10 | |
| 2024/0018807 A1 * | 1/2024 | Hunt | E05B 85/02 | |

FOREIGN PATENT DOCUMENTS

| | | | |
|---|---|---|---|
| CN | 105822154 A * | 8/2016 | E05B 77/265 |
| CN | 111119617 A * | 5/2020 | |
| DE | 10212217 A1 * | 10/2003 | E05B 77/10 |
| DE | 102009029025 A1 * | 3/2011 | E05B 17/0062 |
| DE | 202012007326 U1 * | 12/2013 | E05B 77/04 |

(Continued)

OTHER PUBLICATIONS

Computer Generated Translation for CN111119617, Generated on Dec. 9, 2024, https://worldwide.espacenet.com/ (Year: 2024).*

*Primary Examiner* — Alyson M Merlino
(74) *Attorney, Agent, or Firm* — Renner, Otto, Boisselle & Sklar, LLP

(57) ABSTRACT

A lock for a motor vehicle, in particular a side door lock, comprising a locking mechanism consisting of a rotary latch and at least one pawl, wherein the locking mechanism parts are each rotatably mounted in a lock case by means of a metal spindle, and a reinforcement plate, wherein the spindles of the rotary latch and at least one pawl can be connected by means of the reinforcement plate, and wherein the reinforcement plate is operatively connected to the lock housing in such a way that stabilization of the lock housing can be achieved.

12 Claims, 1 Drawing Sheet

(56) References Cited

FOREIGN PATENT DOCUMENTS

| | | | | | | |
|---|---|---|---|---|---|---|
| DE | 102012214534 | A1 | * | 2/2014 | ............. | E05B 81/06 |
| DE | 202012010242 | U1 | * | 3/2014 | ............. | E05B 77/10 |
| DE | 102018126306 | A1 | * | 4/2019 | ............. | E05B 85/02 |
| DE | 102019131176 | A1 | * | 5/2021 | | |
| DE | 102020100146 | A1 | * | 7/2021 | ............. | E05B 77/04 |
| DE | 1020201311427 | A | | 5/2022 | | |
| DE | 102021127781 | A1 | * | 4/2023 | ............ | B23P 11/005 |
| FR | 2852347 | A1 | * | 9/2004 | ............. | E05B 77/10 |
| FR | 2984940 | A1 | * | 6/2013 | ............. | E05B 77/40 |
| FR | 3007781 | A1 | * | 1/2015 | ............. | E05B 85/02 |
| FR | 3010122 | A1 | * | 3/2015 | ............. | E05B 85/02 |
| KR | 2017077734 | A | * | 7/2017 | ............. | E05B 79/20 |

* cited by examiner

LOCK FOR A MOTOR VEHICLE

FIELD OF DISCLOSURE

The invention relates to a lock for a motor vehicle, in particular a side door lock, having a locking mechanism consisting of a rotary latch and at least one pawl, wherein the locking mechanism parts are in each case rotatably supported in a lock case by means of a metal spindle, and a reinforcement plate, wherein the spindles of the rotary latch and the at least one pawl can be connected by means of the reinforcement plate.

BACKGROUND OF DISCLOSURE

A lock for a motor vehicle is used as a locking system where components that are movably arranged on the motor vehicle, such as doors, flaps or hoods, must be held securely in position during operation of the motor vehicle. The locking systems are of great importance, since the locking systems, as safety-relevant components, must ensure that the components arranged movably on the motor vehicle are held even in extreme situations. This is easy to understand since, for example, an engine hood that opens unintentionally can put the vehicle driver and/or the occupants in life-threatening situations. On the one hand, the forces acting on the motor vehicle while driving, such as impacts, vibrations or environmental influences, play a role, as do the forces acting on the vehicle in the event of an extreme situation, such as an accident.

In a basic structure of a locking system, a lock holder that can be brought into engagement with the locking system is surrounded by the locking system and the movable component is secured in its position. For this purpose, a rotary latch preferably engages in the lock holder, wherein in the locked or latched position the rotary latch is held in the latched position by means of a pawl. In the case of side doors in particular, two latching positions in the lock are required. There is a pre-latching position and a main latching position in which the side door is completely closed.

In order to withstand the high holding forces in the event of an accident, but also with regard to the dynamic stresses during operation of the motor vehicle, the locking mechanism consisting of a rotary latch and pawl is made of a metal material and mounted on metal spindles, wherein the axles in turn are held in a metal lock plate of the motor vehicle lock. Such a lock for a motor vehicle is known, for example, from DE 10 2012 214 534 A1. This document discloses a lock case that is basically made of metal and has a base area with one or more side walls of the lock. One side wall of the lock case always encloses a right angle with the base area. As a rule, there are two side walls that are located opposite one another. The lock case then has a U-shape in a sectional view. If there are no side walls, this is a lock plate that only has one side wall. An entry region in the form of an opening through which the motor vehicle lock can engage with the lock holder is then formed in the side wall and the base plate. When reference is made below to a lock case, this should also include a lock plate.

It is also known from the document that the lock has a reinforcing plate, also made of metal, which is used for the additional rotatable fastening of the rotary latch and/or pawl in order to further stabilize the mounting of the locking mechanism. The rotary latch and the pawl are then usually located between the lock case and the reinforcement plate. The use of the reinforcement plate provides maximum stabilization in the locking mechanism, since the rotary spindles of the locking mechanism parts can be supported on both sides by the lock plate and the reinforcement plate.

Since the components of a lock must be regularly protected from dust and water, a lock basically comprises a lock housing with a lock cover for covering one or more components of the lock. The lock housing together with the lock cover is usually made of plastics material for reasons of weight and manufacture. The lock housing and the lock cover can be in one piece or in several pieces. Such a cover can also serve to protect against burglary.

Another motor vehicle lock with a reinforcement plate is known from DE 10 2012 214 534 A1. The locking mechanism is attached to a base area of a lock case, which is usually made of metal. A lock housing, which is generally made of plastics material and serves as a cover, can be placed on top of these or inserted between them. The subsequent reinforcement plate can be placed directly onto the locking mechanism parts or located above the lock housing. The reinforcement plate is made of metal, wherein the reinforcement plate contributes to rotatable support of components of the locking mechanism such as the rotary latch and pawl. The lock housing can then be closed by a lock cover that is basically made of plastics material.

A side door lock for a motor vehicle has become known from the unpublished DE 10 2020 131 142.7, and comprises a locking mechanism consisting of a rotary latch and at least one pawl, and a lock plate, wherein at least the rotary latch and the pawl are in each case rotatably mounted in the lock case by means of a metal spindle and a reinforcement plate, wherein the spindles of the rotary latch and of the at least one pawl can be connected by means of the reinforcement plate. In addition to the simple formation of the connecting web between the locking mechanism part spindles, the reinforcement plate also has extensions that fulfill other functions in the motor vehicle lock. It is disclosed, for example, that the extension can serve as a stop damper for springs or even as a receptacle for buffers. The reinforcement plate can thus assume a multiple function in the motor vehicle lock.

The reinforcement plates for motor vehicle locks known from the prior art have basically proven their worth. A fundamental problem with which the development in the motor vehicle industry and, in particular, in the area of locking systems for motor vehicles is concerned is that sufficient stability must be guaranteed even in extreme situations. This is in contrast to the specification of weight savings in the structural design of the motor vehicle lock. Thus, on the one hand, the stability of the motor vehicle lock should be maintained or increased and, on the other hand, the stability should be achieved with the lowest possible weight and a small number of components. This is the starting point for the invention.

SUMMARY OF DISCLOSURE

The object of the invention is to provide an improved motor vehicle lock. In particular, the object of the invention is to provide a motor vehicle lock that ensures greater stability in the motor vehicle lock with the same number of components. The motor vehicle lock should be designed in a structurally simple and cost-effective manner.

The object of the invention is achieved in that a lock for a motor vehicle, in particular a side door lock, is provided, comprising a locking mechanism consisting of a rotary latch and at least one pawl, wherein the locking mechanism parts are each rotatably mounted in a lock case by means of a metal spindle, a reinforcement plate, wherein the spindles of the rotary latch and at least one pawl can be connected by means of the reinforcement plate and wherein the reinforcement plate is operatively connected to the lock housing in such a way that stabilization of the lock housing can be achieved. Additional stabilization of the motor vehicle lock can be achieved by the active connection according to the invention between the reinforcement plate and the lock housing. The known components which are already present, such as the lock housing and the reinforcement plate, are advantageously used for this purpose, wherein the arrangement and design of the reinforcement plate are used in combination with the arrangement and design of the lock housing to stabilize the motor vehicle lock. An additional stabilization of the motor vehicle lock can thus take place with the existing components, which in turn enables an increase in stabilization without having to use additional components. The active connection, i.e. the interaction between the lock housing and the reinforcement plate and the structural connection of the reinforcement plate to the lock housing, acts as a stabilizer. The reinforcement plate is therefore used not only to stabilize the spindles of the locking mechanism parts, but also to stabilize the lock housing. The interaction of the lock plate or lock case, spindles of the locking mechanism parts and reinforcement plate, and the interaction of the reinforcement plate with the lock housing made of plastics material, enhances the stability function of the reinforcement plate and thus of the motor vehicle lock as a whole.

If reference is made according to the invention to a lock for a motor vehicle, this lock can be used wherever pivotably and/or displaceably mounted components are arranged on the motor vehicle. This means, for example, flaps, hoods, sliding doors, side doors or covers, without restricting the area of use only to these components. The arrangement of the reinforcement plate according to the invention is preferably used in side doors for motor vehicle locks.

The locking mechanism has a rotary latch and at least one pawl. However, locking mechanisms are also known which are equipped with two or more pawls or latching or blocking levers. The reinforcing plate preferably overlaps at least the rotary latch and the pawl directly in engagement with the rotary latch and connects the spindles of the locking mechanism parts to one another. However, in the case of locking mechanisms with more than one pawl, the reinforcement plate can also overlap and stabilize or secure more than two spindles, namely all components engaged with the locking mechanism and the rotary spindles thereof. It is also known that the reinforcement plate is also used, for example, to support gear wheels arranged in the motor vehicle lock.

As described in the introduction, the lock plate, which can also be designed as a lock case, is made of a metallic material, in particular as a stamped part. Reference is made to a lock plate when the metallic reinforcement in the motor vehicle lock has a planar extension. If the lock plate also has a bent portion which, for example, engages around the entry region of the lock holder, this is referred to as a lock case. The lock case can have one, two or more bent portions and can engage around the lock housing at least in certain areas. The term “lock plate” is used below for all of these embodiments. The locking mechanism parts are accommodated in metal spindles on the lock plate, wherein the metal spindles and the reinforcement plate can also be accommodated in a secured position. The locking mechanism parts are thus mounted in the lock case and the reinforcement plate.

If the reinforcement plate has at least one opening or recess which can be brought into form-fitting engagement with the lock housing at least in certain areas, this results in an advantageous embodiment of the invention. By shaping of the reinforcement plate with a recess or opening, an adaptation to a geometry or a contour of the lock housing can take place. It is thus possible for the lock plate to support the housing in a form-fitting manner, thereby ensuring stabilized housing parts. The opening can, for example, be joined to a curve in the shape of a circular arc, for example to accommodate a motor or a gear part, and thus to support the lock housing.

It can also be advantageous if the opening is a recess, in particular a bore, in which the reinforcement plate is formed and the reinforcement plate can be inserted into the lock housing in a form-fitting manner. For example, if the lock housing has a raised portion, for example a cylindrical raised portion, which represents a screw receptacle, for example, the opening can be fitted over the raised portion in the motor vehicle lock, resulting in a supporting effect in the interaction of the raised portion and the lock plate. The reinforcement plate is primarily made of metal and is preferably designed as a stamped and bent part. During stamping, openings and/or recesses can be made in the reinforcement plate easily and in one working step, so that the raised portions can be easily and securely fitted into the reinforcement plate. This also results in additional stabilization of the motor vehicle lock in the interaction of the reinforcement plate with the support points of the spindles and the joined position of the elevation.

Alternatively, the opening can be designed as a recess, in particular as a bore, in the reinforcement plate and the reinforcement plate can be connected in a form-fitting manner to the lock housing. In addition to the form-fitting accommodation, a force-fitting connection can additionally or alternatively be made between the opening in the reinforcement plate and the lock housing. If, for example, the opening serves for additional screwing of the reinforcement plate to the lock housing, a supporting effect of the lock housing can be achieved. The reinforcement plate, together with the spindles and the lock plate, forms a support means in the motor vehicle lock that can be described as a quadrangular support structure. If this support structure is now additionally connected to the lock housing through the opening, the support structure as well as the lock housing and thus the motor vehicle lock as a whole can be stabilized.

If the reinforcement plate can be brought into engagement with the lock housing, this can have a stabilizing effect on the motor vehicle lock. In this case the reinforcement plate and the lock housing bear against one another in certain areas in a flush and form-fitting manner. The locking mechanism part spindles are connected to one another by means of a connecting web of the reinforcement plate. This connecting web can preferably be designed with additional stiffening ribs. In addition, shape-giving extensions can extend from the connecting web in the direction of the lock housing and/or the connecting web itself can have a shape that fits onto the lock housing in a form-fitting manner and so as to be flush at least in certain areas.

Advantageously, the lock housing can have stiffening ribs and the reinforcement plate can be brought into engagement with the stiffening ribs. Stiffening ribs are stiffeners in the lock housing which stabilize the lock housing and are arranged, for example, between adjacent areas of the lock housing which are angled towards one another. The motor vehicle lock preferably has a planar extension in which the locking mechanism is fastened to the lock plate. Starting from this planar extension of the lock plate, the lock housing can preferably be formed at right angles, to enable arrangement of further components such as child safety devices, an electric drive, a lock, an anti-theft device or further components of the motor vehicle lock. Also, the entry region for the lock holder mostly extends over a substantially right angle of the lock housing, so that reference may be made to an L-shape of the motor vehicle lock. At least one side of the L-shaped extension of the motor vehicle lock is provided with the lock plate. The L-shaped arrangement of the housing can be stiffened by means of stiffening ribs in the housing. If these stiffening ribs now cooperate directly with the reinforcement plate, overall support can be provided by the support structure of the reinforcement plate.

It can also be advantageous if the reinforcement plate has at least one extension starting from a connecting web, wherein the extension can be brought into engagement with the lock housing. The extension can extend from the connecting web in the direction of the lock housing. The extension preferably engages on at least one reinforced area in the motor vehicle lock housing. The extension can be arranged on the reinforcement plate in the area where the locking mechanism part spindle is accommodated and/or on the connecting web. In any case, the extension forms a separate area of the reinforcement plate and supplements the connecting web in such a way that additional support as well as a form-fitting contact on the lock housing can be achieved. The extension thus increases the contact surface of the reinforcement plate or itself forms the contact surface on the lock housing. A combination of stiffening ribs bearing against the connecting web and the extension or multiple extensions bearing against the lock housing is, of course, preferable.

In a continuation of the concept of the invention, at least one bent portion is formed on the reinforcement plate, and the bent portion can be brought into engagement with the lock housing. The bent portion can be arranged directly on the reinforcement plate or can be formed on an extension. The bent portion offers the possibility that the reinforcement plate bears against the housing over a large area. Due to the large contact surface or an enlarged contact surface on the bent portion, a high surface pressure and thus a high force can be transmitted. The stabilizing effect can thus be additionally increased by the bent portion. It is also conceivable that the bent portion can be brought into engagement with the lock housing in a form-fitting manner. The bent portion thus serves to stiffen the reinforcement plate itself and can also provide an enlarged contact surface on the lock housing. A form-fitting integration of the bent portion creates the possibility of achieving additional stabilization of the lock housing. In addition, the bent portion as well as the extensions can have the task of serving as an assembly aid. If, for example, two bent portions are inserted into form-fitting receptacles in the lock housing, the reinforcement plate can be clearly positioned during assembly and the bent portions can thus serve as assembly aids.

In practice during a high loading event such as a collision, the pivot bearings try to spread apart from each other. The reinforcement plate directly constrains the bearing ends together but can still typically rotate about the mounting plate as the forces increase. By supporting the reinforcement against this rotation, it has been demonstrated the plastic housing can improve the overall strength of the latching system without the increased mass of directly connecting the reinforcement to the metal mounting plate.

In addition, the reinforcement plate can have indentations, which can be achieved, for example, by stamping. Indentations can, for example, be introduced into the reinforcement plate as raised portions, for example by means of deep-drawing. These depressions or indentations can then also be brought into engagement with the lock housing in a form-fitting manner, so that additional contact surfaces can be achieved between the reinforcement plate and the lock housing. In any case, the motor vehicle lock housing can be additionally stabilized by the design of the reinforcement plate according to the invention, whereby an additional stiffening of the lock housing can be achieved with the same number of components. The stabilization by the reinforcement plate can then in turn result in higher stability values for the motor vehicle lock itself and/or there is the possibility of making the lock housing slimmer, i.e. with a smaller number of stiffening ribs. Overall, this results in a stabilizing effect with the same number of components and with the possibility of designing the lock housing to be slimmer and therefore lighter.

The invention is explained in more detail below with reference to the attached drawings on the basis of a preferred embodiment. However, the principle applies that the embodiment does not limit the invention, but merely represents one design. The features shown can be implemented individually or in combination with further features of the description as well as the claims, individually or in combination.

DETAILED DESCRIPTION

Figure 1:
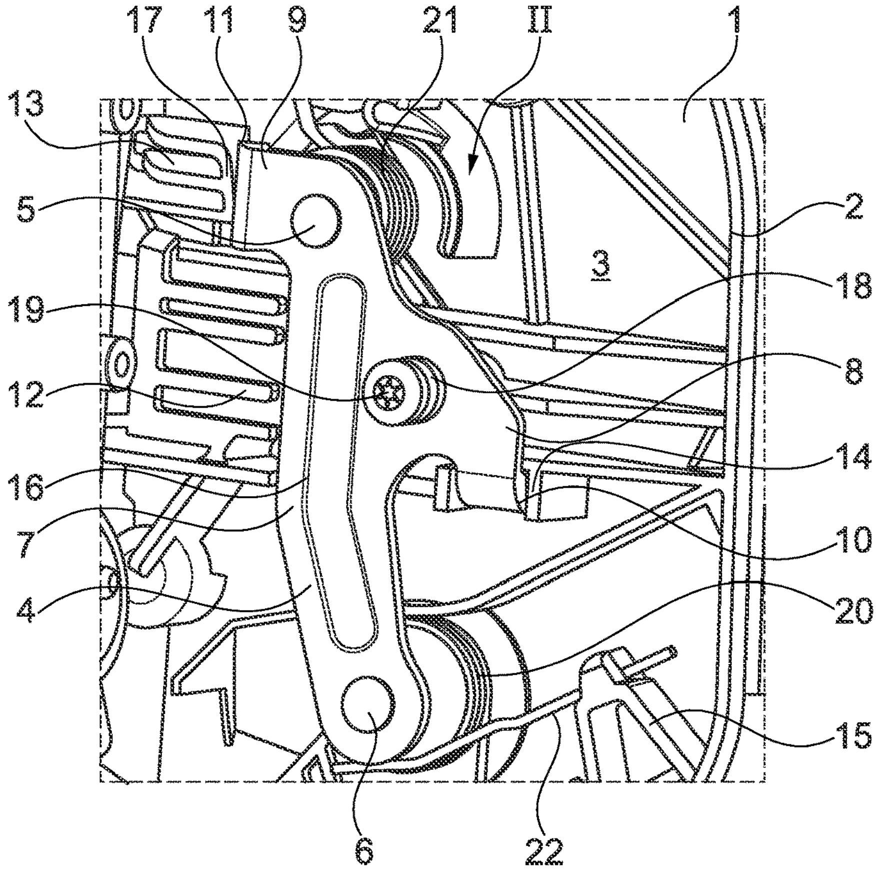
FIG. 1 is a three-dimensional view of an opened motor vehicle lock with a view of the lock housing and a reinforcement plate designed according to the invention.

FIG. 1 shows a motor vehicle lock housing 1 in a top view of the lock housing 2, wherein the lock housing is shown without a housing cover. A reinforcement plate 4 is fixedly mounted in the interior 3 of the lock housing 2. The reinforcement plate extends between the two locking mechanism part spindles 5, 6, which are used to accommodate a locking mechanism that is not visible in the motor vehicle lock 1. The reinforcement plate 4 has a connecting web 7 which extends between the locking mechanism part spindles 5, 6. In addition, the reinforcement plate 4 has two extensions 8, 9, at the ends of which a bent portion 10, 11 is attached. The lock housing 2 is provided with stiffening ribs which are integrally molded into the injection-molded component of the lock housing 2. For the sake of clarity, only individual stiffening ribs are provided with reference signs. The stiffening ribs 12, 13, 14 interact directly with the reinforcement plate 4.

FIG. 1 shows a top view of the opened motor vehicle lock housing and the arrangement of the reinforcement plate 4 in the motor vehicle lock 1. The reinforcement plate 4 connects the locking mechanism part spindles 5, 6 via the connecting web 7. In addition, an indentation 16 is formed in the connecting web 7 and brings additional stability to the reinforcement plate 4. The indentation 16 can also bear against the stiffening ribs 12 in a form-fitting manner. A first extension 9 in the region of the locking mechanism part spindle 5 has a bent portion 11 which in turn engages with the stiffening ribs 13 and in particular with a contact surface 17. The support structure consisting of the locking mechanism part spindles, reinforcement plate and lock case can thus be additionally stabilized by the bent portion and the contact surface 17.

An opening 18 is introduced into the further extension 8, and the reinforcement plate 4 through this opening the reinforcement plate 4 can be connected in a force-fitting manner to the lock housing 2 by means of a screw 19. In addition, the extension 8 has a bent portion 10, wherein the bent portion 10 is inserted into the stiffening ribs 14 of the lock housing 2 in a form-fitting manner. As a result, the reinforcement plate 4 and the lock housing 2 are additionally reinforced. The lock housing 2 is consequently stabilized by the reinforcement plate, the extensions, the bent portions and the screw connection 19. In this way, additional stabilization of the motor vehicle lock 1 can be achieved and, for example, the lock housing 2 can be constructed in a simpler manner, that is to say, for example, with fewer stiffening ribs. This reduction in the number of stiffening ribs in the motor vehicle lock housing 2 in turn leads to a reduction in weight, which in turn has a positive effect on the overall weight of the motor vehicle lock 1.

It can also be seen that the locking mechanism part spindles 5, 6 can serve to accommodate spring elements, wherein reference is made to a spring leg, for example, which bears against the stiffening rib 15 and is held there.

Figure 2:
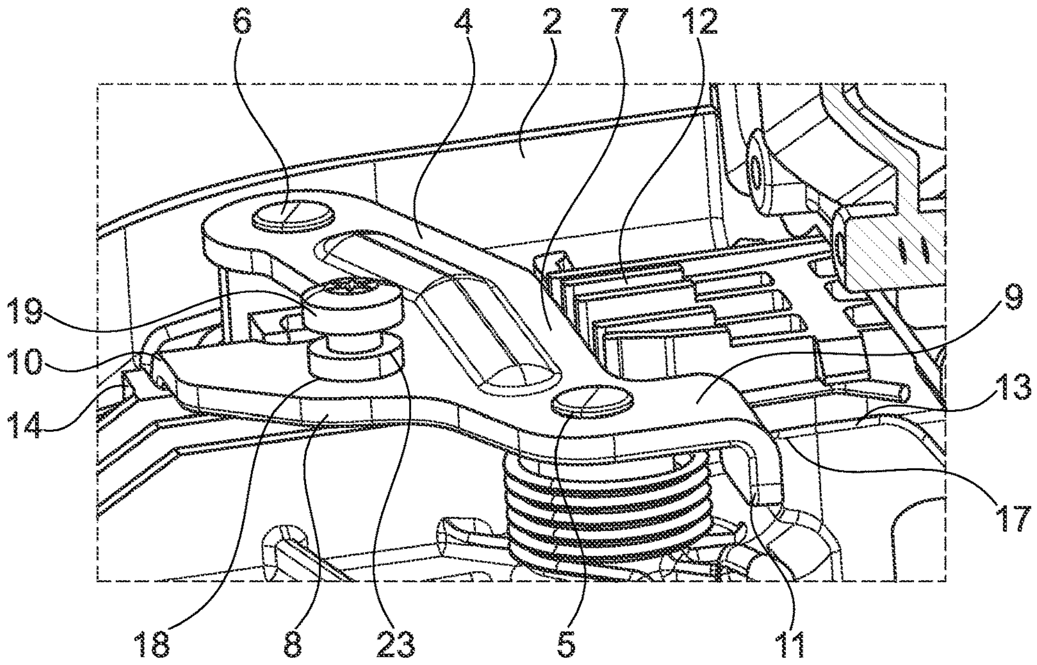
FIG. 2 is a view of the reinforcement plate according to FIG. 1 from the direction of the arrow II.

A view of the reinforcement plate 4 from the perspective of the arrow II from FIG. 1 is shown in FIG. 2. FIG. 2 clearly shows how the stiffening ribs 12, 13, 14 interact with the reinforcement plate 4. The bent portion 11 of the extension 9 is in form-fitting contact with the contact surface 17 as an extension of the stiffening ribs 13. Here there is a surface pressure between the bent portion 11 and the contact surface 17, which can transmit high forces to the motor vehicle lock 1, depending on the load.

In the region of the connecting web 7, the connecting web bears against a row of stiffening ribs 12, so that the connecting web 7 stiffens the lock housing 2 over the length. The connecting web 7 bears against the stiffening ribs 12 and supports the lock housing and in particular the stiffening ribs 7 against external loads.

The extension 8 has two additional support elements 10, 19. The raised portion 23 protrudes through the opening 18 of the reinforcement plate 4, wherein the reinforcement plate 4 can be fixed by means of the screw 19. For this purpose, for example, the screw 19 can be tightened so much that the raised portion 23 is deformed so that, in addition to the force-fitting connection, a form-fitting connection is also established between the raised portion 23 and the reinforcement plate 4.

The lock housing 2 is further stabilized by the bent portion 10 at the end of the extension 8, wherein the bent portion is inserted into the stiffening ribs 14 in a form-fitting manner. The stiffening ribs 14 enclose the bent portion at least on three sides, so that the stiffening ribs 14 can also serve as guide ribs for mounting of the reinforcement plate. Overall, the lock housing 2 is supported in many ways by the reinforcement plate 4 and the motor vehicle lock 1 is stabilized overall.

LIST OF REFERENCE SIGNS

1 motor vehicle lock
2 lock housing
3 interior of the lock case
4 reinforcement plate
5, 6 locking mechanism part spindles
7 connecting web
8, 9 extensions
10, 11 bent portion
12, 13, 14, 15 stiffening ribs
16 indentation
17 contact surface
18 opening
19 screw
20, 21 spring elements
22 spring leg
23 raised portion

The invention claimed is:

1. A lock for a motor vehicle, the lock comprising:
a lock housing,
a locking mechanism including a rotary latch and at least one pawl, wherein the rotary latch and the at least one pawl each is rotatably mounted in the lock housing by a metal spindle, and
a reinforcement plate, wherein the metal spindle of each of the rotary latch and the at least one pawl is connected by the reinforcement plate to define a respective axis of rotation of each of the rotary latch and the at least one pawl, and wherein the reinforcement plate is operatively connected to the lock housing in such a way that stabilization of the lock housing is achieved,
wherein the lock housing has stiffening ribs,
wherein the reinforcement plate has a connecting web extending along a length from a first end to a second end between the connections of the metal spindles to the reinforcement plate,
wherein a first metal spindle of the metal spindles is arranged adjacent the first end of the connecting web and a second metal spindle of the metal spindles is arranged adjacent the second end of the connecting web,
wherein the reinforcement plate further includes an extension that includes an opening for attaching the reinforcement plate to the lock housing and a bent portion that directly engages the stiffening ribs, and
wherein the extension is positioned such that the opening is arranged adjacent a portion of the length of the connecting web between the first end and the second end.

2. The lock for a motor vehicle according to claim 1, wherein the opening is configured for form-fitting engagement with the lock housing at least in certain areas of the lock housing.

3. The lock for a motor vehicle according to claim 2, wherein the opening is a bore in the reinforcement plate and the reinforcement plate is configured for insertion into the lock housing in a form-fitting manner.

4. The lock for a motor vehicle according to claim 2, wherein the opening is a bore in the reinforcement plate and the reinforcement plate is connected to the lock housing by a screw in a force-fitting manner.

5. The lock for a motor vehicle according to claim 1, wherein the reinforcement plate has another bent portion, wherein the other bent portion engages the lock housing.

6. The lock for a motor vehicle according to claim 5, wherein the other bent portion engages the lock housing in a form-fitting manner.

7. The lock for a motor vehicle according to claim 1, wherein the reinforcement plate has an indentation.

8. The lock for a motor vehicle according to claim 1, wherein the lock housing includes a planar extension, so as to be connected to the reinforcement plate via the first and second metal spindles, and the locking mechanism is fastened to the lock housing at the planar extension.

9. The lock for a motor vehicle according to claim 8, wherein the lock housing is formed at a right angle to the planar extension such that the lock housing has an L-shape.

10. The lock for a motor vehicle according to claim 1, wherein the reinforcement plate includes a second extension extending from the connecting web, wherein the second extension is arranged in an area where one of the first and second metal spindles is accommodated.

11. The lock for a motor vehicle according to claim 1, further comprising a spring element accommodated on each of the first and second metal spindles of the rotary latch and the at least one pawl.

12. The lock for a motor vehicle according to claim 1, wherein the connecting web bears against a row of stiffening ribs of the lock housing.

* * * * *